(12) United States Patent
Gormley

(10) Patent No.: US 8,411,573 B2
(45) Date of Patent: Apr. 2, 2013

(54) SYSTEMS AND METHODS FOR HYBRID RATE-LIMITING SCHEMES BASED ON PROTOCOL DATA UNIT CHARACTERISTICS

(75) Inventor: Eamonn Gormley, Redmond, WA (US)

(73) Assignee: Eden Rock Communications, LLC, Bothell, WA (US)

( * ) Notice: Subject to any disclaimer, the term of this patent is extended or adjusted under 35 U.S.C. 154(b) by 436 days.

(21) Appl. No.: 12/690,883

(22) Filed: Jan. 20, 2010

(65) Prior Publication Data
US 2010/0214925 A1 Aug. 26, 2010

Related U.S. Application Data

(60) Provisional application No. 61/155,238, filed on Feb. 25, 2009.

(51) Int. Cl.
*H04L 12/28* (2006.01)
(52) U.S. Cl. .................................................. 370/235.1
(58) Field of Classification Search .............. 370/235, 370/235.1
See application file for complete search history.

(56) References Cited

U.S. PATENT DOCUMENTS

| 6,687,247 | B1 * | 2/2004 | Wilford et al. ............ 370/392 |
| 6,724,721 | B1 * | 4/2004 | Cheriton ................... 370/229 |
| 2005/0078603 | A1 | 4/2005 | Turner et al. | |
| 2006/0114912 | A1 | 6/2006 | Kwan et al. | |
| 2008/0130669 | A1 | 6/2008 | Loeb et al. | |
| 2009/0010165 | A1 | 1/2009 | Kim et al. | |
| 2010/0260044 | A1 * | 10/2010 | Gormley ................... 370/230 |

OTHER PUBLICATIONS

International Search Report and Written Opinion for PCT/US10/21542, dated Aug. 23, 2010.

* cited by examiner

*Primary Examiner* — Melvin Marcelo

(57) ABSTRACT

A networked computing system that utilizes a hybrid rate-limiting scheme to jointly affect both PDU payload throughput and total PDU throughput. The networked computing system includes one or more service provider devices (SPDs), one or more subscriber computing devices (SCDs), and a data communications network facilitating data communications between a SPD and a SCD. The SPD can apply the hybrid rate-limiting scheme to data communications provided to the SCD, based on both protocol data unit (PDU) header and payload characteristics. The hybrid rate-limiting scheme can simultaneously facilitate rate-limiting PDU payload throughput and rate-limiting total PDU throughput.

14 Claims, 9 Drawing Sheets

SYSTEMS AND METHODS FOR HYBRID RATE-LIMITING SCHEMES BASED ON PROTOCOL DATA UNIT CHARACTERISTICS

CROSS REFERENCE TO RELATED APPLICATIONS

The present application claims the benefit of U.S. Provisional Application No. 61/155,238, filed Feb. 25, 2009.

FIELD OF THE INVENTION

The field of the present invention generally relates to systems and methods that facilitate rate-limiting of packet data communications at various network devices within a data communications network. In order to evaluate and rate-limit packet data communications, a network service provider may advantageously employ one or more specialized rate-limiting schemes to limit the maximum data throughput that a subscriber can obtain.

BACKGROUND OF THE INVENTION

Modern wireless and wireline data communications networks employ packet data processing and exchanges at various layers within digital data communication's Open System Interconnection Reference Model (the OSI model). As would be understood by those skilled in the art, the OSI Model is an abstraction that defines conceptual, layered communications and computer network protocol design. At its core, the OSI model divides a network's communication architecture into seven distinct components, which include the following layers (from top to bottom): Application, Presentation, Session, Transport, Network, Data-Link, and Physical Layers. Generally, a particular OSI layer provides services to the layer above it and additionally the same OSI layer also receives services from the layer below it. Depending on where a given layer resides within an OSI stack, there may or may not be a layer above or below it with which the layer exchanges services.

In the context of a layered protocol stack, a unit of data specified in a given layer is commonly referred to as a protocol data unit (PDU). The PDU typically includes both payload and overhead (i.e., header information) data. A PDU may be referred to by other terms, such as a frame, a packet, a segment, a message, and so on . . . . In order to facilitate network communications, layered protocol stacks must facilitate transfer of PDU data amongst different portions (e.g., both wireless and wireline portions) of a data communications network. At each protocol layer, header information exists that can comprise a variety of data transfer information. Header data size generally remains constant for a given protocol layer, but it can also be variable. As data is passed to lower layers of the protocol stack, additional header information, specific to that layer can be added to the PDU. As data is passed to upper layers of the protocol stack, header information that is not used by the upper layers is generally removed from the PDU.

A PDU header may contain crucial data transfer information as well as instructions about data being carried in a particular PDU's payload. This information and these instructions may include, but are not limited to: a destination address (e.g., an IP address where a PDU is being routed through or delivered to), an originating address (e.g., an IP address where a PDU came from), PDU size information, synchronization information that allows a PDU to be compatible within an existing network infrastructure, a PDU sequence number that identifies which PDU a current PDU pertains to in a sequence of PDUs, a PDU protocol (with networks that carry many different types of information, the PDU protocol may define what type of PDU is being transmitted: e-mail data, webpage data, streaming video data, image data, etc.), encryption security data (encapsulating security payload information), etc.

Each PDU payload of a particular data transmission typically has a fixed-size PDU header attached to it before it is sent over a network communications link in a distributed data communications network. The PDU header is subsequently removed from the PDU payload at the receiving end of the network communications link so that sequenced payload data can be reassembled at a receiving device. In general, a PDU header represents a fixed communication link overhead that is required to ensure that PDU payload data is correctly routed to its delivery destination.

As would be understood by those skilled in the Art, with a constant PDU payload throughput (e.g., a throughput measured in Mbps) on a particular network communications link, the total PDU throughput (including fixed-size PDU header data, measured in bytes) depends on an average PDU payload size. By way of example, if an average PDU payload size decreases on a network communications link, while the PDU payload throughput remains constant, then an actual link throughput will increase in proportion to the decrease in the average PDU size. Likewise, if an average PDU payload size increases on a network communications link, while PDU payload throughput remains constant, then an actual link throughput will decrease in proportion to the increase in the average PDU size. Due to the fact that an actual link throughput can drastically change with respect to variations in average PDU payload size (as the average PDU payload size decreases, while PDU payload throughput and header data size remain constant), there can be extreme scenarios where actual link throughput may be negatively impacted based on the nature of data communications that result in a relatively small average PDU payload data size (e.g., if the average PDU payload size is less than a designated multiple of the PDU header size, such as ten times the PDU header size).

Modern service providers commonly employ rate-limiting schemes that limit the PDU payload throughput in vacuum of the various data types that are being transferred across network communications links within portions of a larger data communications network. Further, present day service level agreements may not account for total PDU throughput, based on both payload and header size information, when allocating network resource limits to subscribers via various predetermined data-rate plans.

Considering how different data types can affect the relationship of an average payload size compared with an average or constant header size can be very important for network resource planning considerations. For example, in a case where communications of a particular data type results in a small average payload size, in relation to a constant PDU header size, a total throughput consumed on a communications link is substantially larger than the throughput of the PDU payload data alone. This additional link throughput may be much larger than a service provider anticipated when they drafted their service level agreements for regional network subscribers. Accordingly, service providers should account for more than just user-generated traffic represented by PDU payload throughput.

Short-sighted network traffic planning can ultimately lead to periods of network congestion (data transfer loads that burden network capacity and throughput) between links in a larger data communications network. These overload periods can degrade a service provider network's Quality of Service (QOS) as well as network service subscribers' collective Quality of Experience (QOE) within a particular network, especially during peak data transfer periods. Some negative effects of poor traffic planning can lead to adversely affected network QOS and QOE metrics, which may result in: queuing delay, data loss, as well as blocking of new and existing network connections for certain network subscribers.

It would be beneficial to have improved systems and methods utilizing hybrid rate-limiting schemes that allow service providers to advantageously plan for both user-generated traffic and for traffic generated by a user in combination with necessary traffic generated by appending PDU header data to PDU payload data. By contemplating and accounting for total PDU throughput, service providers could mitigate situations where small average payload size data would unnecessarily burden actual link throughput on a communications link within a portion of a larger data communications network. It would further be desirable to improve network resource allocation by practically enforcing hybrid rate-limiting schemes and by contractually enforcing more robust service level agreements that could affect network bandwidth maximization for a wide range of network subscribers transferring a variety different data types across portions of a distributed data communications network.

SUMMARY OF THE INVENTION

This summary is provided to introduce (in a simplified form) a selection of concepts that are further described below in the Detailed Description. This summary is not intended to identify key features of the claimed subject matter, nor is it intended to be used as an aid in determining the scope of the claimed subject matter.

In overcoming the above disadvantages associated with modern data communications systems that employ rate-limiting schemes that evaluate only characteristics associated with protocol data unit (PDU) payload data, the present invention discloses improved data communications systems and methods that utilize a hybrid rate-limiting scheme to evaluate characteristics associated with both PDU payload throughput and with total PDU throughput. In an embodiment, the data communications system includes one or more service provider devices (SPDs), one or more subscriber computing devices (SCDs), and a data communications network that can facilitate data communications between a particular SPD and a particular SCD. In an embodiment, the SPD is capable of applying a hybrid rate-limiting scheme to data communications provided to the SCD, based on both PDU header and payload characteristics.

In accordance with another aspect of the present invention, a hybrid rate-limiting scheme facilitates rate-limiting PDU payload throughput.

In accordance with a further aspect of the present invention, a hybrid rate-limiting scheme facilitates rate-limiting total PDU throughput.

In accordance with yet another aspect of the present invention, the hybrid rate-limiting scheme utilizes a dual token bucket algorithm that independently facilitates rate-limiting of PDU payload throughput and rate-limiting of total PDU throughput.

In accordance with yet a further aspect of the present invention, the dual token bucket algorithm includes a first token bucket component for metering PDU payload throughput and a second token bucket component for metering total PDU throughput.

In accordance with another aspect of the present invention, when the dual token bucket algorithm determines that there are not enough PDU payload tokens in the first token bucket component to facilitate transfer of a next PDU in a data transfer queue, the next PDU is held in queue until sufficient PDU payload tokens become available.

In accordance with yet another aspect of the present invention, when the dual token bucket algorithm determines that there are not enough total PDU tokens in the second token bucket component to facilitate transfer of a next PDU in a data transfer queue, the next PDU is held in queue until sufficient total PDU tokens become available.

In accordance with a further aspect of the present invention is a computer-readable medium encoded with computer-executable instructions for utilizing a hybrid rate-limiting scheme. When executed, the computer-executable instructions on the computer-readable medium can perform a method including: applying a hybrid rate-limiting scheme to data communications provided to a SCD by a SPD over a data communications network, based on both PDU header and payload characteristics.

In accordance with a further aspect of the present invention is a computer-implemented method for communicating digital data. The computer-implemented method includes the steps of: applying a hybrid rate-limiting scheme to data communications provided to a SCD by a SPD over a data communications network, based on both PDU header and payload characteristics.

BRIEF DESCRIPTION OF THE DRAWINGS

Preferred and alternative examples of the present invention are described in detail below with reference to the following Figure drawings.

DETAILED DESCRIPTION

Figure 1:
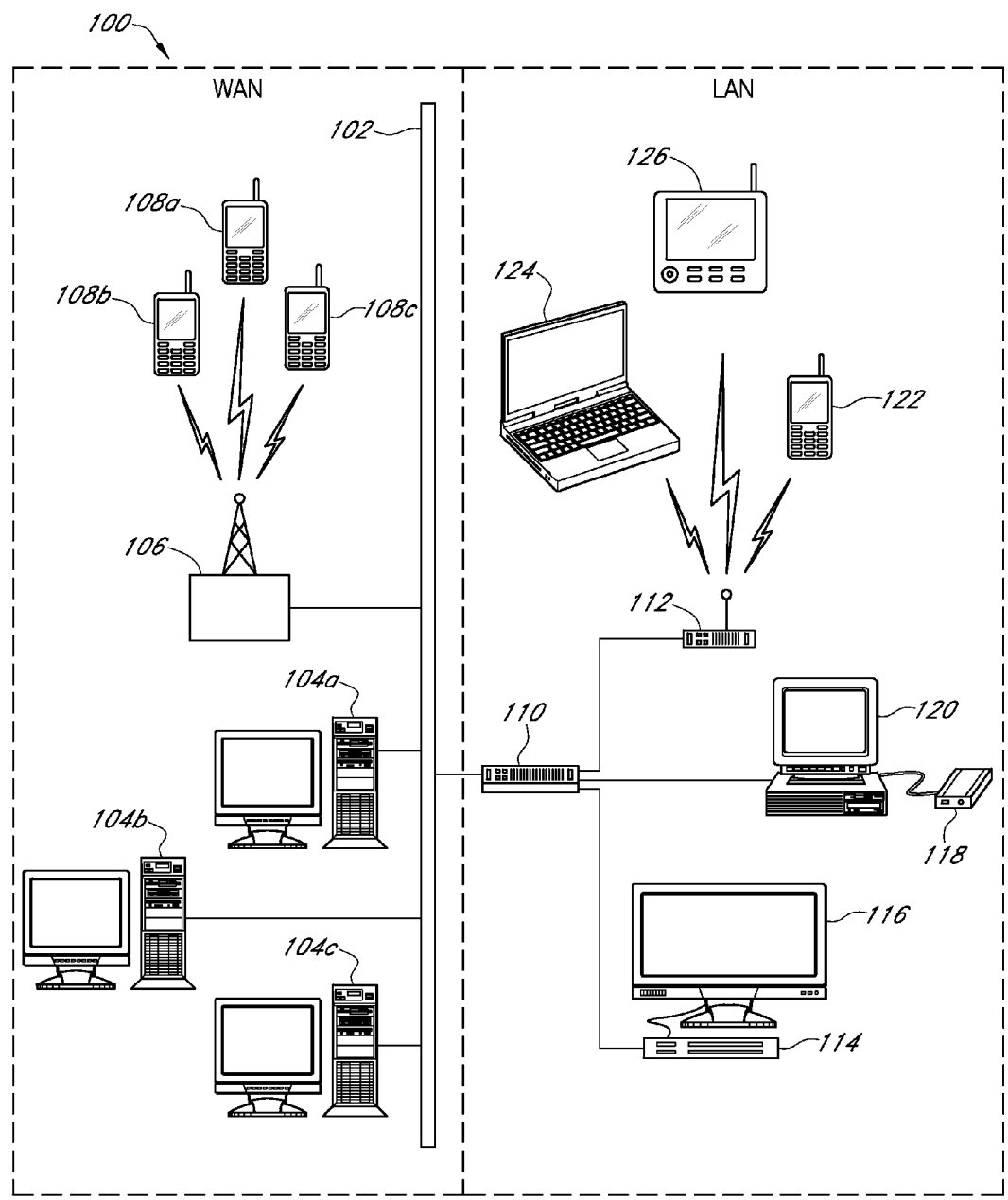
FIG. 1 illustrates a perspective view of a distributed data communications system in accordance with embodiments of the present invention.

In accordance with an exemplary embodiment of the present invention, FIG. 1 illustrates a networked computing system 100 including various wireline and wireless computing devices that may be utilized to implement any of the hybrid rate-limiting processes associated with various embodiments of the present invention. The networked computing system 100 may include, but is not limited to, a group of remote service provider devices 104a-c (SPDs), including server computers or any other common network device known in the art such as a routers, gateways, or switch devices, which can support network resource allocation and/or digital data communications services to various network subscriber computing devices (SCDs) (e.g., any of SCDs 108a-c, 110, 112, 114, 120, 122, 124, and 126) within the networked computing system 100; a data communications network 102 (including both Wide Area Network (WAN) and Local Area Network (LAN) portions); a variety of remote, wireless SCDs, including cellular phone/PDA devices 108a-c along with any other variety of portable wireless computing device well known in the art (e.g., electronic book devices, handheld gaming units, personal music players, netbooks, video recorders, MiFi™ devices, etc.) that may be connected to the data communications network 102 utilizing one or more wireless basestation 106 or any other common wireless or wireline network communications technology; one or more network gateways or switch devices 110 that can facilitate data communications processes within the LAN and between the LAN and the WAN of the data communications network 102; a television device 116 (e.g., a high definition LCD or Plasma television) that is connected to a multi-media device 114 (e.g., a set-top box, digital video recorder (DVR), Blu-Ray™ player, and/or a digital video disk (DVD) player/recorder device); a desktop computer 120 optionally connected to an external hard-drive device 118; a wireless router 112 that may communicate with various wireless LAN SCDs (e.g., cellular phones 130, PDAs, electronic book devices 126, handheld gaming units, personal music players, netbooks, laptop computers 124, video recorders, Mi-Fi™ devices, etc.) using any common local wireless communications technology, such as Wi-Fi™

In an embodiment, the SPDs 104a-c, the wireless basestation 106, the remote wireless SCDs (108a-c), and any of the LAN connected SCDs (110, 114, 120, 122, 124, or 126) may be configured to run any known operating system, including but not limited to, Microsoft® Windows®, Mac OS®, Linux®, Unix®, or any common mobile operating system, including Symbian®, Palm®, Windows Mobile®, Mobile Linux®, MXI®, etc. In an embodiment, the remote SPDs 104a-c and the wireless basestation 106 may employ any number of common server, desktop, laptop, and personal computing devices. In an embodiment, the remote SCDs (108a-c) and the LAN connected SCDs (110, 114, 120, 122, 124, or 126) may include any combination of common mobile computing devices (e.g., laptop computers, netbook computers, cellular phones, PDAs, handheld gaming units, electronic book devices, personal music players, Mi-Fi™ devices, video recorders, etc.), having wireless communications capabilities employing any common wireless data commutations technology, including, but not limited to: Wi-Fi™ Wi-Max™, GSM™, UMTS™, LTE™, LTE Advanced™, etc.

In an embodiment, either of the LAN or the WAN portions of the data communications network 102 of FIG. 1 may employ, but are not limited to, any of the following common communications technologies: optical fiber, coaxial cable, twisted pair cable, Ethernet cable, and powerline cable, along with any wireless communication technology known in the art. In an embodiment, any of the remote service provider devices 104a-c, the wireless basestation 106, the LAN connected SCDs (110, 114, 120, 122, 124, or 126), or the remote wireless SCDs (108a-c) may include any standard computing software and hardware necessary for processing, storing, and communicating data amongst each other within the networked computing system 100. The computing hardware realized in any of the data networked computing system 100 computing devices (104a-c, 106, 108a-c, 110, 112, 114, 120, 122, 124, or 126) may include, but is not limited to: one or more processors, volatile and non-volatile memories, user interfaces, transcoders, and wireline and/or wireless communications transceivers, etc.

In an embodiment, any of the SPDs or SCDs of FIG. 1 (104a-c, 106, 108a-c, 110, 112, 114, 120, 122, 124, or 126) may be configured to include one or more computer-readable media (e.g., any common volatile or non-volatile memory type) encoded with a set of computer readable instructions, which when executed, performs a portion of one or more of the hybrid-rate limiting processes and supporting communications functionality associated with various embodiments of the present invention.

Figure 2:
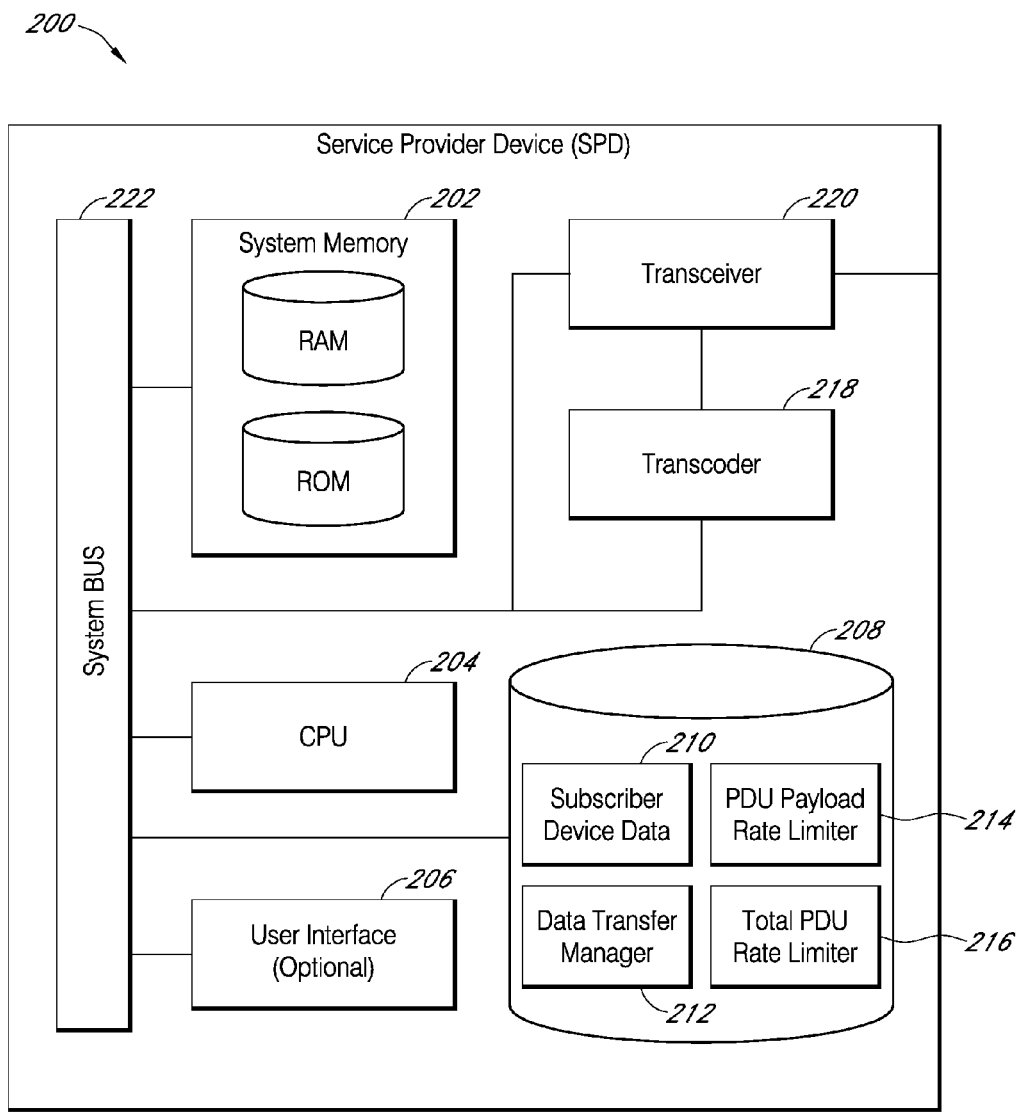
FIG. 2 illustrates a block diagram view of a service provider device (SPD) in accordance with embodiments of the present invention.

FIG. 2 shows a block diagram view of a SPD 200 that may be representative of any of the remote service provider devices 104a-c or the basestation 106 in FIG. 1, or any other common network device known in the art such as a router, gateway, or switch device. The SPD 200 may include, but is not limited to, one or more processor devices including a central processing unit (CPU) 204. In an embodiment, the CPU 204 may include an arithmetic logic unit (ALU, not shown) that performs arithmetic and logical operations and one or more control units (CUs, not shown) that extract instructions and stored content from memory and then executes and/or processes them, calling on the ALU when necessary during program execution. The CPU 204 is responsible for executing all computer programs stored on the SPD's 200 volatile (RAM) and nonvolatile (ROM) system memories, 202 and 208.

The SPD 200 may also include, but is not limited to, an optional user interface 206 that allows a service provider administrator to interact with the SPD's 200 software and hardware resources; a software/database repository 208 including: subscriber device data 210 that may include a listing of service registered SCDs (e.g., any of SCDs 108a-c, 110, 112, 114, 120, 122, 124, or 126) as well as their communications attributes, a data transfer manager application 212 that facilitates communications between the SPD 200 service-registered SCDs (e.g., any of SCDs 108a-c, 110, 112, 114, 120, 122, 124, or 126), a PDU payload rate-limiting component 214 that is capable of rate-limiting PDU payload throughput, a total PDU rate-limiting component 216 that is capable of rate-limiting total PDU throughput, including both PDU header and payload data; a transcoder 218 for formatting data communications prior to transfer; a transceiver 220 for transmitting and receiving network communications amongst various network SCDs and SPDs utilizing the data communication network 102 of the networked computing system 100; and a system bus 222 that facilitates data communications amongst all the hardware resources of the SPD 200.

In accordance with an embodiment of the present invention, the SPD 200 data transfer manager 212 may be logically linked to the PDU payload rate limiter component 214 and the total PDU rate limiter component 216, such that the hybrid rate-limiting schemes of the present invention may be applied to subscriber (e.g., utilizing subscriber device data stored in the SPD 200 software/database repository 208) communications at the SPD 200. In an embodiment, a service provider controlling the operations of the SPD 200 may selectively enforce various subscriber data-rate plans (those specified in subscriber service level agreements) by simultaneously rate-limiting PDU payload throughput via the PDU payload rate-limiter component 214 along with total PDU throughput via the total PDU rate limiter component 216.

Figure 3:
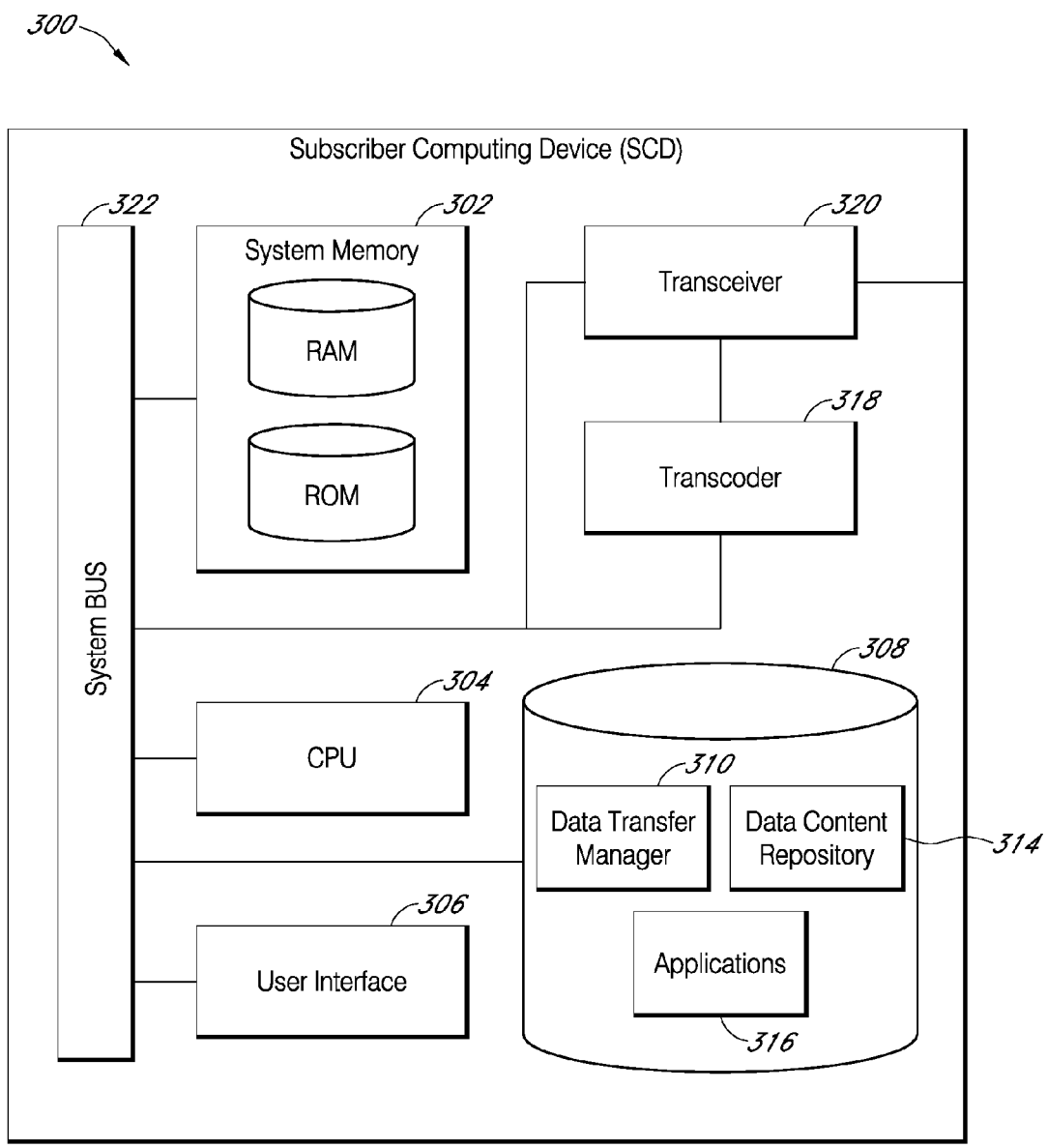
FIG. 3 illustrates a block diagram view of a subscriber computing device (SCD) in accordance with embodiments of the present invention.

FIG. 3 shows a block diagram view of a SCD 300 that may be representative of any of the LAN-connected SCDs or the remote wireless SCDs (108*a-c*, 110, 112, 114, 120, 122, 124, or 126) in FIG. 1. The SCD 300 may include, but is not limited to, one or more processor devices including a central processing unit (CPU) 304. In an embodiment, the CPU 304 may also include an arithmetic logic unit (ALU, not shown) that performs arithmetic and logical operations and one or more control units (CUs, not shown) that extract instructions and stored content from memory and then executes and/or processes them, calling on the ALU when necessary during program execution. The CPU 304 is responsible for executing all computer programs stored on the SCD's 300 volatile (RAM) and nonvolatile (ROM) system memories, 302 and 308.

The SCD 300 may also include, but is not limited to, a user interface 306 that allows a user to interact with the SCD's 300 software and hardware resources; a software/database repository 308 including: a data transfer manager application 310 that facilitates communications amongst the SCD 300, various SPDs (104*a-c* and 106), and other networked SCDs (108*a-c*, 110, 112, 114, 120, 122, 124, or 126) utilizing the data communication network 102 of the networked computing system 100, a data content repository 314 comprising various user data and communications related data and parameters, and various end-user applications 316 that can allow the SCD 300 to perform various local functions utilizing resident hardware and software resources; a transcoder 318 for formatting data communications prior to transfer; a transceiver 320 for transmitting and receiving network communications amongst various network SCDs (108*a-c*, 110, 112, 114, 120, 122, 124, or 126) and SPDs (104*a-c* and 106) utilizing the data communication network 102 of the networked computing system 100; and a system bus 322 that facilitates data communications amongst all the hardware resources of the SCD 300.

Figure 4:
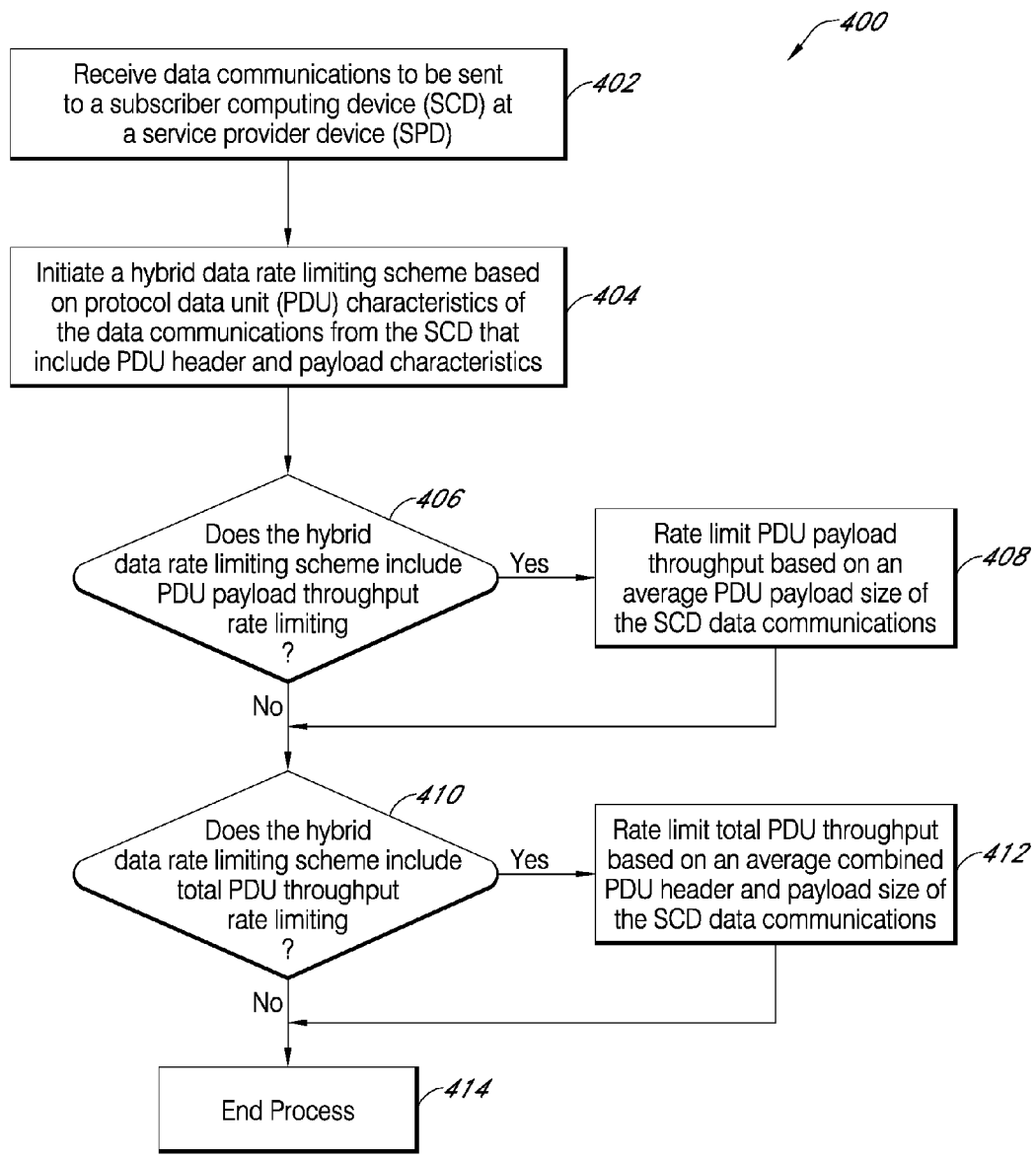
FIG. 4 illustrates a flow diagram depicting a hybrid rate-limiting process associated with an embodiment of the present invention.

FIG. 4 illustrates a flow diagram 400 depicting a hybrid rate-limiting process associated with an embodiment of the present invention. It should be understood that this process 400 could be executed using one or more computer-executable programs stored on one or more computer-readable media located on any of the network computing system's 100 remote service provider devices 104*a-b* or at basestation 106 (or on any other common service provider device) of FIG. 1. At block 402, a service provider device (e.g., any of SPDs 104*a-b* or 106) receives data communication to be sent to a subscriber computing device (e.g., any of SCDs 108*a-c*, 110, 112, 114, 120, 122, 124, or 126) emanating from either another network SCD or a SPD. Next, at block 404, a hybrid rate-limiting scheme is initiated based on protocol data unit (PDU) characteristics of the data communications from the SCD 300 that include PDU header and PDU payload characteristics. In accordance with an embodiment of the invention the PDU header and payload characteristics pertain to the combined size (in bytes) of the PDU header and payload data and/or the individual size characteristics of each of the PDU header and payload data.

Then at decision block 406 it is determined if the hybrid rate-limiting scheme includes PDU payload throughput rate-limiting. If it is determined that the hybrid rate-limiting scheme does include PDU payload throughput rate-limiting, then at block 408, PDU payload throughput is rate-limited based on an average PDU payload size of the SCD data communications. Next the process proceeds to decision block 410. However if it is determined that the hybrid rate-limiting scheme does not include PDU payload throughput rate-limiting, then at decision block 410, it is determined if the hybrid rate-limiting scheme includes total PDU throughput rate-limiting. If it is determined that the hybrid rate-limiting scheme does include total PDU throughput rate-limiting, then the process proceeds to block 412, where total PDU throughput is rate limited based on an average combined PDU header and payload size of the SCD data communications. Subsequently the process ends at block 414. If it is determined that the hybrid rate-limiting scheme does not include total PDU throughput rate-limiting, then the process ends to block 414.

In an embodiment, hybrid data rate-limiting (generally employed at a SPD 200) may include the simultaneous limiting of both PDU payload throughput and total PDU throughput for a portion of regional subscriber communications. In another embodiment, hybrid data rate-limiting may include separate, sequential limiting of both PDU payload throughput and total PDU throughput at different times in a hybrid rate-limiting process. In another embodiment, hybrid rate-limiting may include only rate-limiting one of PDU payload throughput or total PDU throughput at various stages in a rate-limiting process.

Figure 5:
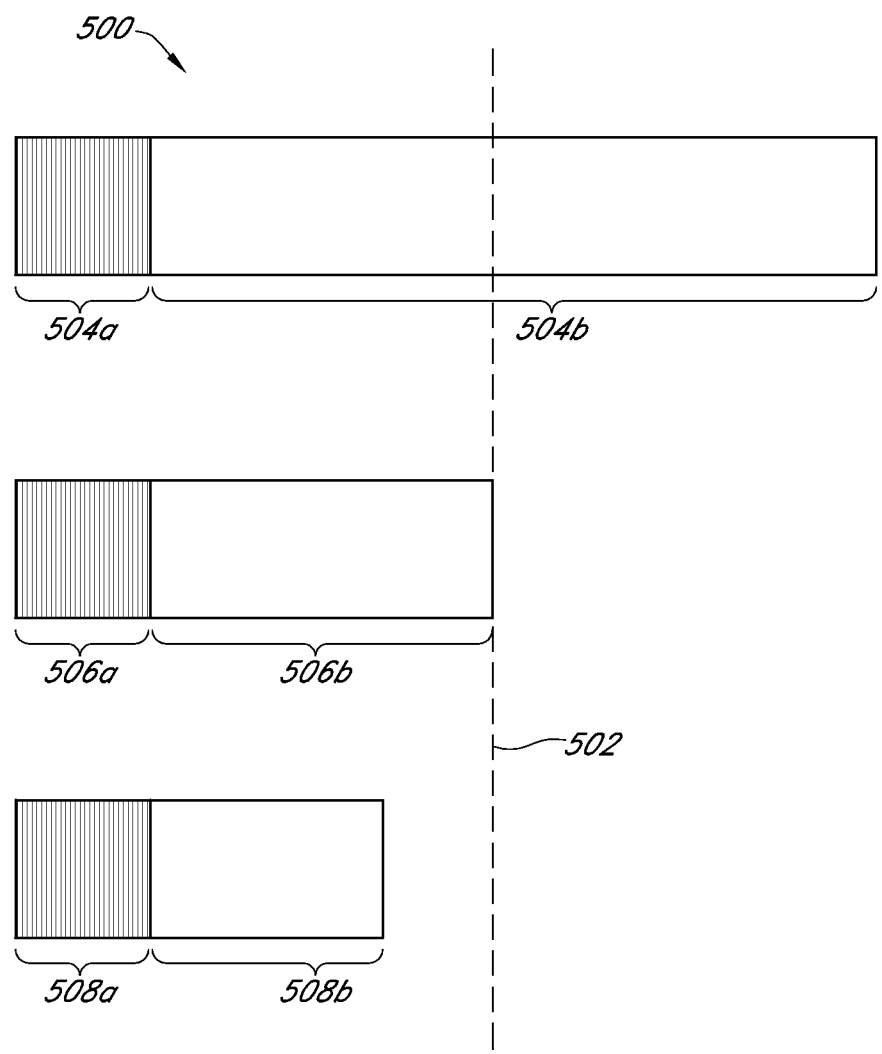
FIG. 5 illustrates a perspective view of multiple protocol data units (PDUs), having both header and payload data, which are representative of average PDUs sizes that could be communicated across a distributed data communications system in accordance with embodiments of the present invention.

FIG. 5 depicts a view of three PDUs 500 representative of average PDU sizes for multiple, different data-type transfers (e.g., for data transfers having a substantially large average PDU payload, for data transfers having moderately-sized average PDU payload, and for data transfers having a small average PDU payload). The PDUs 500 are vertically aligned in descending order according to both average PDU payload size and average total PDU size, including combined PDU header and payload size. An average PDU size limit threshold is represented by a dotted line 502 that is vertically aligned perpendicular to all three PDUs' 500 lengthwise directions. From top to bottom, all three PDUs 500 may have a fixed PDU header data size 504*a*, 506*a*, and 508*a*, corresponding to set number of bytes of header data (e.g., 30 bytes of header data).

These bytes of PDU header data may pertain to various data transfer information including, but are not limited to: a destination address (e.g., an IP address where a PDU is being routed through or delivered to), an originating address (e.g., an IP address where a PDU came from), PDU size information, synchronization information that allows a PDU to be compatible within an existing network infrastructure, a PDU sequence number that identifies which PDU a current PDU pertains to in a sequence of PDUs, a PDU protocol (with networks that carry many different types of information, the PDU protocol defines what type of PDU is being transmitted: e-mail data, webpage data, streaming video data, image data, etc.), encryption security data (encapsulating security payload information), etc.

All three PDUs may have varying payload data sizes 504*b*, 506*b*, and 508*b*. Similarly, all three PDUs 500 may have the same or varying PDU header data size 504*a*, 506*a*, and 508*a*. In implementing hybrid rate-limiting schemes in accordance with various embodiments of the present invention, both PDU payload throughput and total PDU throughput may be simultaneously rate-limited in accordance with average PDU size limit thresholds represented by average PDU size limit threshold 502.

In an embodiment, assuming the respective average PDU payload sizes were: 1000 bytes for the first average PDU payload data 504b, 300 bytes for the second average PDU payload data 506b, and 100 bytes for the third average PDU payload data 508b, and a threshold average PDU payload size limit threshold 502 were set at 300 bytes, a service provider may elect to rate-limit PDU payload throughput for average PDU payload data sized greater than or equal to 300 bytes. Similarly, with a threshold average total PDU size limit threshold 502 set at 300 bytes, a service provider may elect to rate-limit total PDU throughput for average PDU payload data sized less than or equal to 300 bytes of data. In this dual rate-limiting scenario, average PDU size characteristics (e.g., average PDU payload size and/or average total PDU size) of various subscriber data transmissions may be rate-limited in accordance with predetermined or dynamically modifiable threshold throughput limits that are assigned by a particular service provider.

In accordance with various embodiments of the present invention, one data transfer rate may be enforced for the PDU payload throughput of the PDUs in a particular data communications session, while at the same time, a separate data transfer rate may to be enforced for the total PDU throughput, which includes both PDU header and payload data. By employing hybrid rate-limiting schemes that enable multiple independent data transfer rates to be enforced at the same time, both wireless and wireline data communications providers may specify in their service level agreements, maximum user data throughput on the communications link as long as an average PDU size (e.g., an average total PDU size) of user data is above a threshold size. If the average user PDU size is below the threshold size then a total amount of link resources consumed by a particular data flow may be capped by a second threshold limit (e.g., an average PDU payload size).

In general, most modern service level agreements between digital data communications providers and their customers/subscribers/end-users typically specify the maximum data throughput that a particular customer will be provided based on a selected data rate plan (e.g., a pay-for-service data rate plan). This data throughput limit may be enforced by a service provider at one or more SPDs (e.g., at a network server 104a-c, basestation 106, or any other network control/service facility), typically employing a rate-limiting scheme that includes only single token bucket rate-limiting.

There are multiple, different measures of throughput that can be defined for a typical digital data communications system, but for clarity only two are discussed herein. PDU payload throughput is throughput related to only the payload portion of one or more PDUs. The PDU payload portion of a PDU is generally user-generated data. Accordingly, PDU payload throughput is primarily user-generated traffic. This throughput is not at all related to data contained in PDU headers. In contrast, total PDU throughout does include data related to PDU headers in addition to PDU payloads.

Figure 6A:
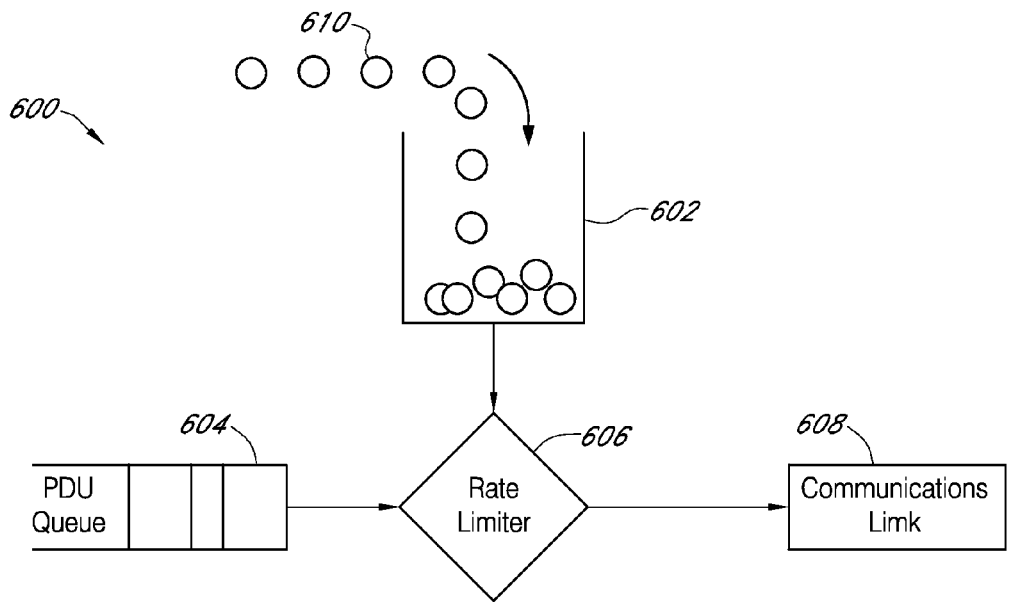
FIG. 6A illustrates a token and bucket rate-limiting diagram associated with single rate, rate-limiting processing in data communications systems of the Prior Art.

FIG. 6A illustrates a standard token bucket rate-limiting diagram depicting a processes 600 associated with the Prior Art that generally rate-limits user-generated traffic. Tokens 610 representing a service level agreement's specified, available data are added to a single token bucket 602 at a constant rate. A token represents a service level permission to transmit a certain number of bytes worth of data during a particular time. The token bucket 602 has a predetermined token retainer size, corresponding to a maximum number of tokens that the token bucket 602 can hold at any time, which further corresponds to the maximum number of bytes that can be transmitted in a single burst on a data communications link 608 at a particular time (in-line with a particular service level agreement). This is commonly known as the maximum burst size of the user-generated traffic that can be placed on the communications link 608. As PDUs of a data transfer arrive at a SPD 200 (e.g., a SPD employing a single token bucket rate-limiting algorithm), the PDUs are initially placed in a PDU queue 604, awaiting transfer. A single rate rate-limiter 606, then determines if there are sufficient tokens 610 in the token bucket 602 to allow the next PDU in queue 604 to be pulled from the head of the queue and placed on the data communications link 608. If there are enough tokens 610 available in the token bucket 602, subsequently, the rate limiter 606 removes the PDU from the queue 604 and places the PDU on the communications link 608 for transfer to an end receiving device. The rate limiter also removes tokens from the token bucket corresponding to the PDU size. This process repeats for every PDU in queue 604. Generally, a particular number of tokens 610 may correspond to a size of single PDU. Accordingly, multiple tokens 610 may be removed from the token bucket 602 to facilitate the transfer of a single PDU having a designated PDU header (e.g., 504a, 506a, and 508a) and PDU payload size (e.g., 504b, 506b, and 508b).

If the number of bytes represented by the tokens 610 in the token bucket 602 is less than the size of the PDU at the head of the queue 604, then the PDU is held in the queue 604 until a sufficient additional number of tokens 610 have been added to the token bucket 602. The standard single token bucket rate-limiter can only facilitate a service provider specifying a maximum throughput for one definition of throughput of a data flow (e.g., pertaining to user-generated traffic) over a particular data communications link 608.

Figure 6B:
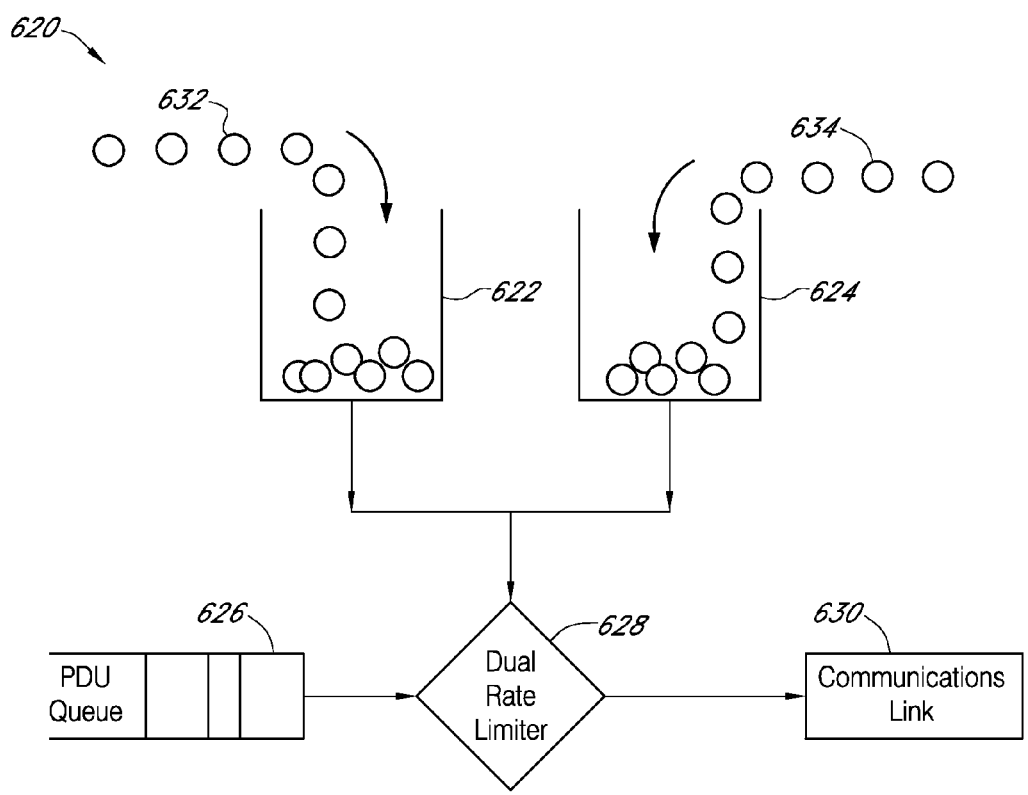
FIG. 6B illustrates a token and bucket rate-limiting diagram associated with dual rate, rate-limiting processing in distributed, data communications systems associated with embodiments of the present invention.

FIG. 6B illustrates a hybrid token bucket rate-limiting diagram depicting various rate-limiting processes 620 associated with embodiments of the present invention. These rate-limiting processes may facilitate both PDU payload throughput rate-limiting and total PDU throughput rate-limiting. In an embodiment, PDU payload throughput tokens 632 (relating only to PDU payload) representing a service level agreement's specified, available transfer capacity are added to a first payload throughput token bucket 622 at a constant rate. Simultaneously, total PDU throughput tokens 634, also representing the service level agreement's specified, available transfer capacity, are added to a second total PDU throughput token bucket 624 at a constant rate. Both the first PDU payload throughput token bucket 622 and the second total PDU throughput token bucket 624 have predetermined token retainer sizes, corresponding to a maximum number of tokens that each token bucket 622, 624 can hold at any time, which proportionally corresponds to the maximum number of bytes that can be transmitted in a continuous burst on a data communications link 630 at a particular time (in-line with a particular service level agreement). In general, a number of bytes represented by a total PDU throughput token 634 is a multiple of the number of bytes represented by a PDU payload throughput token 632 and this data size is a based on the maximum PDU header overhead that a service provider wishes to maintain for in its portion of a larger network.

As PDUs of a data transfer arrive at a SPD 200 (e.g., a SPD employing a dual token bucket rate-limiting algorithm), the PDUs are initially placed in a PDU queue 624, awaiting transfer. A dual rate rate-limiter 628, then determines if there are sufficient tokens 632, 634 in each of the PDU payload and total PDU throughput token buckets 622, 624 to allow the next PDU in queue 626 to be pulled from the head of the queue and placed on the data communications link 630. If there are enough tokens 632, 634 available in both token buckets 622, 624, subsequently, the dual rate limiter 628 removes the leading PDU from the queue 626 and places the PDU on the communications link 630 for transfer to an end receiving device. This process repeats for every PDU in the queue 626. In contrast, if there are not enough tokens 632, 634 independently available in each token bucket 622, 624, then the dual rate limiter 628 holds the leading PDU in queue 626 until sufficient tokens 632, 634 become available to facilitate the data transfer of the next PDU in queue 626. This token-availability verification process repeats for every PDU in queue 626.

Generally, a particular number of tokens 632 or 634 in either the first PDU payload throughput token bucket 622 or the second total PDU throughput token bucket 624 may independently correspond to a size of single PDU in queue. Accordingly, multiple tokens 632, 634 may be removed from each of the first PDU payload throughput token bucket 622 or the second total PDU throughput token bucket 624 to facilitate the transfer of a single PDU having designated PDU header (e.g., 504a, 506a, and 508a) and PDU payload sizes (e.g., 504b, 506b, and 508b).

In an embodiment, the dual rate-limiter 628 implemented within a hybrid token bucket algorithm offers a mechanism by which a service provider can rate-limit both user-generated PDU payload throughput and total PDU throughput, simultaneously. If the average PDU payload size 504b, 506b, or 508b generated by an end user drops during a data transfer below a threshold 502 (e.g., either a PDU payload or a total PDU threshold) then the PDU payload throughput may decrease while the total PDU throughput remains constant.

If a service provider wishes to limit the maximum PDU header overhead to a designated percent ("x %") of an average PDU payload size, then the number of bytes represented by the Total PDU tokens may be represented by the following formula:

TotalPDU_TokenSize(in bytes)=(1+x%)×PDUPayload_TokenSize(in bytes)

By way of example, on a link that is rate-limited to 1 Mbps with a constrained PDU header size of 30 bytes, an operator may want to limit the PDU overhead to no more than 10% of the PDU payload size. Assume that tokens are added to the token buckets at a rate of 1 token for every 10 ms. In this case, the tokens being added to the PDU payload token bucket represent 10 kBytes of data each and the tokens being added to the total PDU throughput token bucket represent 11 kBytes of data each. Under this scenario, the average PDU payload size for which the total PDU token bucket will start rate limiting the total PDU throughput is provided by the following formula:

AveragePDU_PayloadSizeThreshold(in bytes)=(PDU-HeaderSize/x%), wherein "x %" is again the maximum PDU header overhead, as specified above.

As would be understood by those skilled in the art with a constant PDU payload throughput (e.g., a throughput measured in Mbps) on a particular network communications link, actual link throughput (including fixed-size PDU header data, measured in bytes) proportionally depends on an average PDU payload size. Due to the fact that an actual link throughput can drastically change with respect to variations in average PDU payload size (as the average PDU payload size decreases, while PDU payload throughput and header data size remain constant), there can be extreme scenarios where actual link throughput may be negatively impacted based on the nature of data communications that result in a relatively small average PDU payload data size (e.g., at average PDU payload sizes less than 100 bytes). A graphical representation of these phenomena can be seen in the Link Throughput vs. PDU Payload Size plot 700 illustrated in FIG. 7. This rate of change plot 700 has an x-axis 704 representing PDU payload size (in bytes), and a y-axis 702 representing actual link throughput in Mbps. The curve 706 represents the change in link throughput with respect to the change in PDU payload size at a constrained PDU payload throughput of 1 Mbps and a constrained PDU header size of 30 bytes (See legend 708 for constrained variables). As graphically depicted by the curve 706, as PDU payload size 704 becomes substantially small (e.g., less than 10× the PDU header size), total link throughput 702 increases rapidly.

Figure 7:
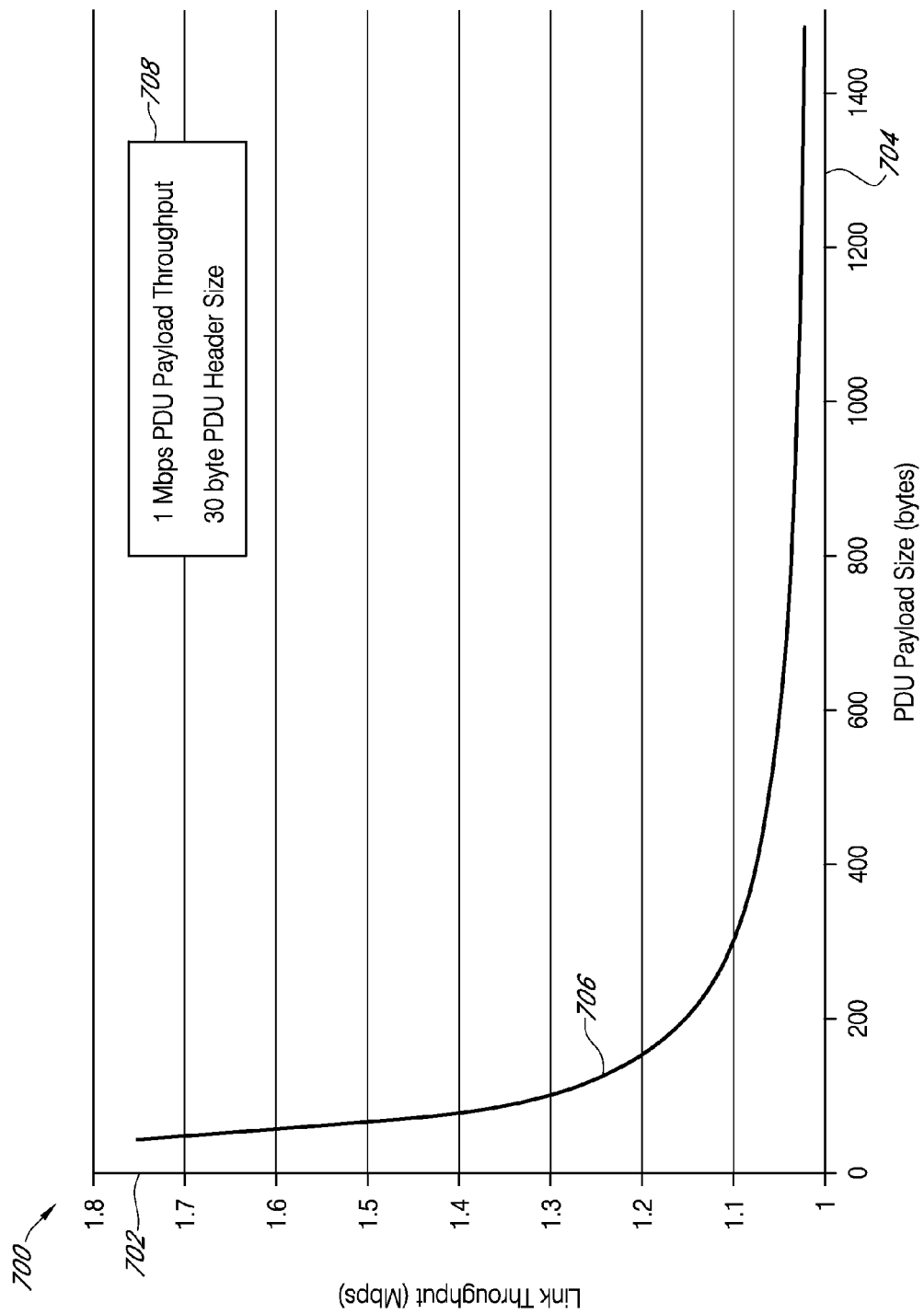
FIG. 7 illustrates a graphical representation of how a data communications link's throughput changes in proportion to changes in average PDU payload size in accordance with embodiments of the present invention.

By way of example, referring to FIG. 7, first assume a service level agreement between a service provider and an end user for a 1 Mbps service, where the 1 Mbps represents the throughput limit for the end user data (i.e. PDU payload data). Also assume that the PDU header size for this link is constrained 30 bytes. If the end user is generating PDUs at a rate of 1 Mbps with an average PDU payload size of 1500 bytes then the total throughput over the link is:

1Mbps×(1530/1500)=1.02Mbps, which is 2% more than the user throughput.

However, if an end user is generating PDUs at a rate of 1 Mbps with an average PDU size 100 bytes then the total throughput over the link is:

1Mbps×(130/100)=1.3Mbps, which is 30% more than the user throughput.

If the average user PDU size is even smaller, then the throughput over the communications link will be even greater.

Figure 8:
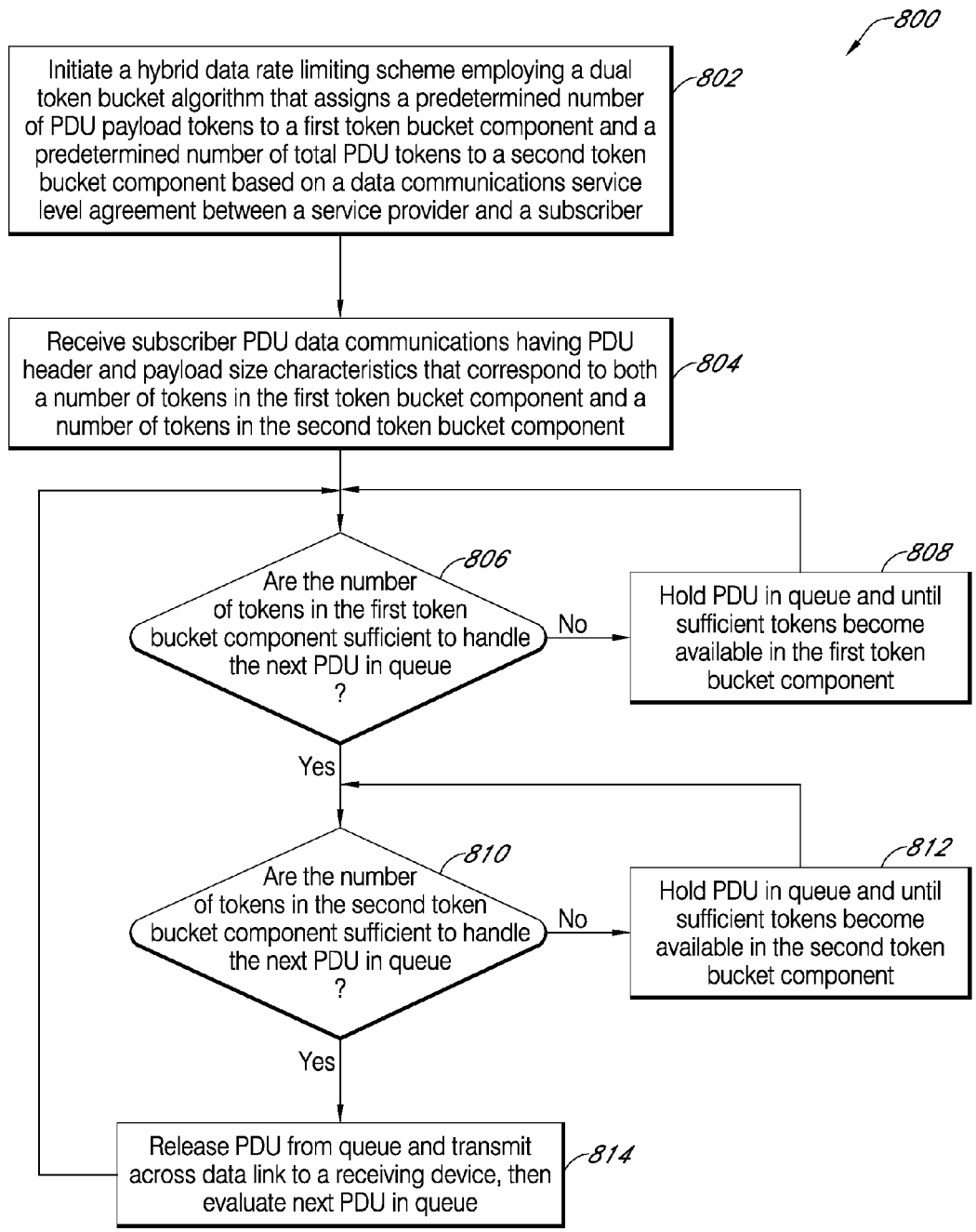
FIG. 8 illustrates a flow diagram depicting dual token and bucket rate-limiting processes associated with an embodiment of the present invention.

FIG. 8 illustrates a flow diagram 800 of dual token and bucket rate-limiting processes associated with a hybrid rate-limiting scheme in accordance with an embodiment of the present invention. It should be understood that these processes 800 could be executed using one or more computer-executable programs stored on one or more computer-readable media located on any of the network computing system's 100 remote service provider devices 104a-b or at basestation 106 (or on any other common service provider device) of FIG. 1. At block 802, a hybrid data rate-limiting scheme is initiated at a SPD. The scheme employs a dual token bucket algorithm that is capable of assigning a predetermined number of PDU payload tokens 632 to a first bucket component 622 and a predetermined number of total PDU throughput tokens 634 to a second bucket component 624 based on a data communications service level agreement between a service provider and a subscriber or group of subscribers. Then at block 804 a SPD receives subscriber PDU data communications having PDU header and payload size characteristics that correspond to both a number of tokens 632 in the first bucket component 622 and a number of tokens 634 in the second bucket component 624. Next at decision block 806, it is determined if the number of tokens 632 in the first bucket component 622 is sufficient to handle the next PDU in queue 626. If it is determined that the number of tokens 632 in the first bucket component 622 is not sufficient to handle the next PDU in queue 626, then the process proceeds to block 808, where the next PDU in queue 626 is held until sufficient tokens 636 become available in the first token bucket component 622. Next the process reverts back to decision block 806. Whenever it is determined that the number of tokens 632 in the first bucket component 622 is sufficient to handle the next PDU in queue 626, then the process proceeds to decision block 810.

Subsequently, at decision block 810, it is determined if the number of tokens 634 in the second bucket component 624 is sufficient to handle the next PDU in queue 626. If it is determined that the number of tokens 634 in the second bucket component 624 is not sufficient to handle the next PDU in queue 626, then the process proceeds to block 812, where the next PDU in queue 626 is held until sufficient tokens 634 become available in the second token bucket component 624. Next the process reverts back to decision block 810. Whenever it is determined that the number of tokens 634 in the second bucket component 624 is sufficient to handle the next PDU in queue 626, the process proceeds to decision block 814. At block 814, after it has been determined that sufficient tokens exist in both the first bucket component and the second bucket component, to handle the next PDU in queue, the next PDU in queue 626 is released to be transmitted across a data communications link 630 to a receiving device. Subsequently, the process reverts back to decision block 806 so that the next PDU in queue can be evaluated in similar fashion as the first PDU in queue.

Figure 9:
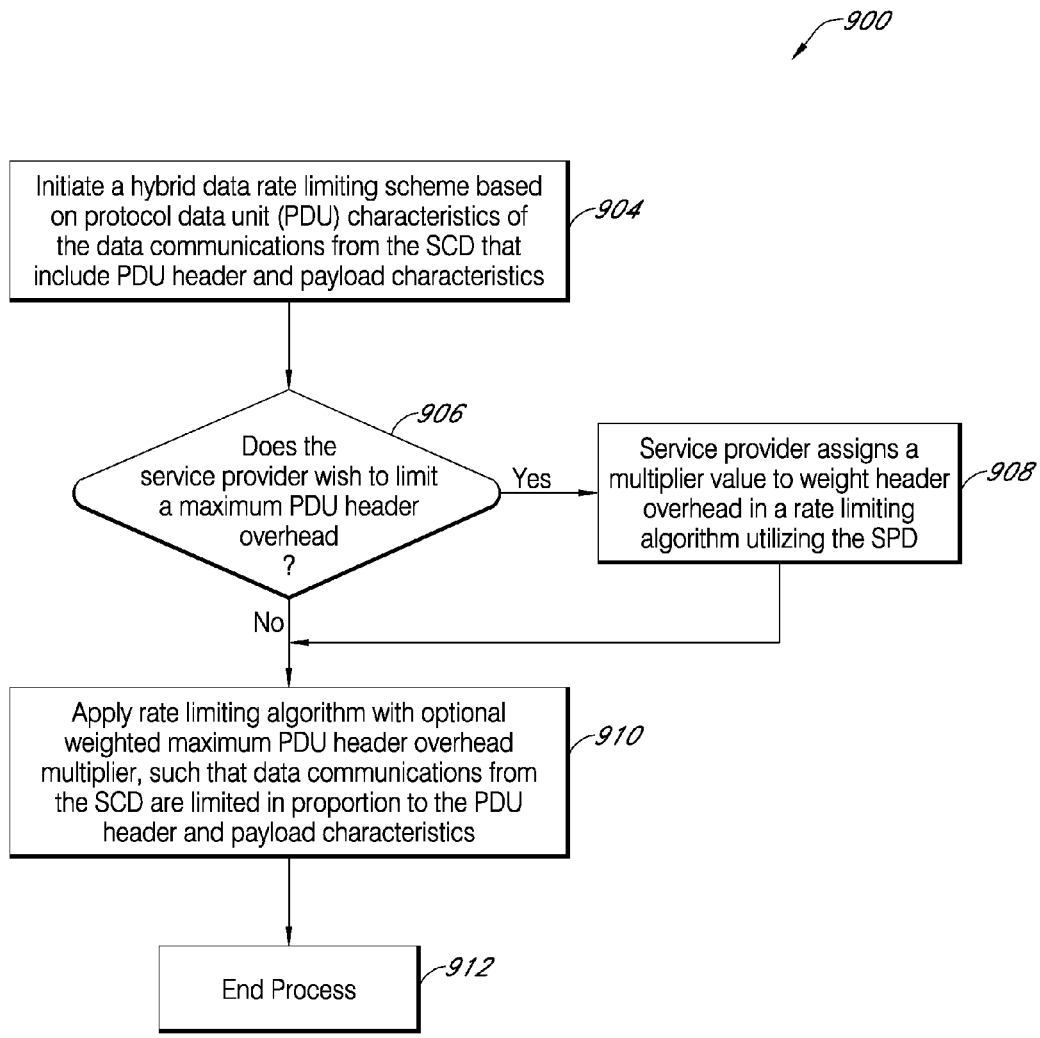
FIG. 9 illustrates a flow diagram depicting a hybrid rate-limiting process having optional overhead weighting processes associated with an embodiment of the present invention.

FIG. 9 illustrates a flow diagram 900 depicting a hybrid rate-limiting scheme having optional overhead weighting processes associated with an embodiment of the present invention. It should be understood that these processes 900 could be executed using one or more computer-executable programs stored on one or more computer-readable media located on any of the network computing system's 100 remote service provider devices 104a-b or at basestation 106 (or on any other common service provider device) of FIG. 1. At block 904, the SPD initiates a hybrid data rate limiting scheme based on PDU characteristics of the data communications from the SCD that include both PDU header and payload size characteristics.

Subsequently, at decision block 906 it is determined if a service provider (the service provider controlling the SPD) wishes to limit a maximum PDU header overhead. If it is determined that the service provider wishes to limit a maximum PDU header overhead, the process proceeds to block 908, where the service provider optionally assigns a multiplier value to weight header overhead in a rate-limiting algorithm utilizing the SPD. Subsequently the process proceeds to block 910. However, if it is determined that the service provider does not wish to limit a maximum PDU header overhead, the process proceeds to block 910, where a rate-limiting algorithm, optionally having a weighted maximum overhead multiplier, is applied so that data communications from the SCD are limited in proportion to the PDU header and payload characteristics. Then the process ends at block 912. The process can be restarted when new data communications are received at the SPD.

An embodiment the present invention may facilitate a method of limiting the throughput of PDUs on a data communications link, such that one throughout rate is enforced for the PDU payload size of the PDU while a separate rate is enforced for the total PDU size of the PDU, which includes PDU headers. Further this limiting of throughput may employ a rate limiter comprising a modified token bucket rate-limiter with a first token bucket to limit the throughput rate of the PDU payload and a second token bucket to limit the total PDU throughput rate.

In practical situations, this invention may be used any place where a maximum PDU payload throughput in a communications link needs to be limited, and a second total PDU throughput also needs to be limited when the average PDU payload size is below a threshold. One such place could be in a wireless or wireline data link where a PDU header overhead can sometimes be a large fraction (e.g. greater than 10%) of the average PDU payload size.

While several embodiments of the present invention have been illustrated and described herein, many changes can be made without departing from the spirit and scope of the invention. Accordingly, the scope of the invention is not limited by any disclosed embodiment. Instead, the scope of the invention should be determined from the appended claims that follow.

The embodiments of the invention in which an exclusive property or privilege is claimed are defined as follows:

1. A networked computing system for utilizing a hybrid rate-limiting scheme, the networked computing system comprising:
   at least one service provider device (SPD);
   at least one subscriber computing device (SCD); and
   a data communications network facilitating data communications between a SPD and a SCD,
   wherein the SPD applies a hybrid rate-limiting scheme to data communications provided to the SCD, based on both protocol data unit (PDU) header and payload characteristics; and
   wherein the hybrid rate-limiting scheme facilitates rate-limiting PDU payload throughput and total PDU throughput.

2. A networked computing system for utilizing a hybrid rate-limiting scheme, the networked computing system comprising:
   at least one service provider device (SPD);
   at least one subscriber computing device (SCD); and
   a data communications network facilitating data communications between a SPD and a SCD,
   wherein the SPD applies a hybrid rate-limiting scheme to data communications provided to the SCD, based on both protocol data unit (PDU) header and payload characteristics; and
   wherein the hybrid rate-limiting scheme utilizes a dual token bucket algorithm that independently facilitates rate-limiting of PDU payload throughput and rate-limiting of total PDU throughput.

3. The networked computing system of claim 2, wherein the dual token bucket algorithm comprises a first token bucket component for metering PDU payload throughput associated with PDU payload data and a second token bucket component for metering total PDU throughput associated with total PDU data.

4. The networked computing system of claim 3, wherein if the dual token bucket algorithm determines there are not enough PDU payload tokens in the first token bucket component to facilitate transfer of a next PDU in a data transfer queue, the next PDU is held in queue until sufficient PDU payload tokens become available.

5. The networked computing system of claim 3, wherein if the dual token bucket algorithm determines there are not enough total PDU tokens in the second token bucket component to facilitate transfer of a next PDU in a data transfer queue, the next PDU is held in queue until sufficient total PDU tokens become available.

6. A non-transitory computer-readable medium encoded with computer-executable instructions for utilizing a hybrid rate-limiting scheme, which when executed, performs a method comprising:
   applying a hybrid rate-limiting scheme to data communications provided to a subscriber computing device (SCD) by a service provider device (SPD) over a data communications network, based on both protocol data unit (PDU) header and payload characteristics, wherein the hybrid rate-limiting scheme facilitates rate-limiting PDU payload throughput and total PDU throughput.

7. The non-transitory computer-readable medium of claim 6, wherein the hybrid rate-limiting scheme utilizes a dual token bucket algorithm that independently facilitates rate-limiting of the PDU payload throughput and rate-limiting of the total PDU throughput.

8. The non-transitory computer-readable medium of claim 7, wherein the dual token bucket algorithm comprises a first token bucket component for metering PDU payload throughput associated with PDU payload data and a second token bucket component for metering total PDU throughput associated with total PDU data.

9. The non-transitory computer-readable medium of claim 8, wherein if the dual token bucket algorithm determines there are not enough PDU payload tokens in the first token bucket component to facilitate transfer of a next PDU in a data transfer queue, the next PDU is held in queue until sufficient PDU payload tokens become available.

10. The non-transitory computer-readable medium of claim 8, wherein if the dual token bucket algorithm determines there are not enough total PDU tokens in the second token bucket component to facilitate transfer of a next PDU in a data transfer queue, the next PDU is held in queue until sufficient total PDU tokens become available.

11. A computer-implemented method for communicating digital data, the method comprising:

applying a hybrid rate-limiting scheme to data communications provided to a subscriber computing device (SCD) by a service provider device (SPD) over a data communications network, based on both protocol data unit (PDU) header and payload characteristics, wherein the hybrid rate-limiting scheme facilitates rate-limiting PDU payload throughput and total PDU throughput.

12. The computer-implemented method of claim 11, wherein the hybrid rate-limiting scheme utilizes a dual token bucket algorithm that independently facilitates rate-limiting of the PDU payload throughput and rate-limiting of the total PDU throughput.

13. The computer-implemented method of claim 12, wherein the dual token bucket algorithm comprises a first token bucket component for metering PDU payload throughput associated with PDU payload data and a second token bucket component for metering total PDU throughput associated with total PDU data.

14. The computer-implemented method of claim 13, wherein if the dual token bucket algorithm determines there are not enough PDU payload tokens in the first token bucket component to facilitate transfer of a next PDU in a data transfer queue, the next PDU is held in queue until sufficient PDU payload tokens become available, and wherein if the dual token bucket algorithm determines there are not enough total PDU tokens in the second token bucket component to facilitate transfer of a next PDU in a data transfer queue, the next PDU is held in queue until sufficient total PDU tokens become available.

* * * * *